United States Patent
Kaleva et al.

(10) Patent No.: US 10,715,226 B2
(45) Date of Patent: Jul. 14, 2020

(54) APPARATUS AND METHOD FOR CONTROL SIGNALLING IN UPLINK PRECODING

(71) Applicant: NOKIA SOLUTIONS AND NETWORKS OY, Espoo (FI)

(72) Inventors: Jarkko Kaleva, Oulu (FI); Antti Tölli, Oulu (FI); Markku Juntti, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 22 days.

(21) Appl. No.: 16/076,960

(22) PCT Filed: Feb. 12, 2016

(86) PCT No.: PCT/EP2016/052997
§ 371 (c)(1),
(2) Date: Aug. 10, 2018

(87) PCT Pub. No.: WO2017/137090
PCT Pub. Date: Aug. 17, 2017

(65) Prior Publication Data
US 2019/0044592 A1    Feb. 7, 2019

(51) Int. Cl.
| | |
|---|---|
| *H04B 7/0456* | (2017.01) |
| *H04B 7/0417* | (2017.01) |
| *H04B 7/0404* | (2017.01) |
| *H04B 7/0452* | (2017.01) |
| *H04L 5/14* | (2006.01) |

(52) U.S. Cl.
CPC ......... *H04B 7/0456* (2013.01); *H04B 7/0404* (2013.01); *H04B 7/0421* (2013.01); *H04B 7/0452* (2013.01); *H04L 5/1469* (2013.01)

(58) Field of Classification Search
None
See application file for complete search history.

(56) References Cited

U.S. PATENT DOCUMENTS

| | | | | |
|---|---|---|---|---|
| 2010/0195614 | A1* | 8/2010 | Nimbalker | H04W 72/1289 370/330 |
| 2011/0032839 | A1* | 2/2011 | Chen | H04B 7/024 370/252 |
| 2011/0110455 | A1* | 5/2011 | Gaal | H04L 5/14 375/295 |

(Continued)

FOREIGN PATENT DOCUMENTS

WO    2010124252 A2    10/2010

OTHER PUBLICATIONS

Dahlman et al.; "4G: LTE/LTE-Advanced for Mobile Broadband"; Second Edition, Elsevier, 2014; Section 9-11; 168 pages.

(Continued)

*Primary Examiner* — Chi H Pham
*Assistant Examiner* — Vladislav Y Agureyev
(74) *Attorney, Agent, or Firm* — Brake Hughes Bellermann LLP (57) ABSTRACT

An apparatus and a method for control signaling are disclosed. The method comprises communicating (402) with one or more user terminals utilising Time Division Duplexing, estimating (404) uplink precoder parameters for the one or more user terminals, the parameters comprising an uplink precoder matrix and a scaling factor and transmitting (406) the uplink precoder parameters utilising a downlink pilot signal and downlink control signalling.

14 Claims, 3 Drawing Sheets

(56) References Cited

U.S. PATENT DOCUMENTS

| | | | | |
|---|---|---|---|---|
| 2012/0082192 A1* | 4/2012 | Pelletier | ............ | H04W 72/0406 375/219 |
| 2012/0114030 A1* | 5/2012 | Yue | ....................... | H04L 1/1819 375/227 |
| 2012/0140723 A1* | 6/2012 | Taoka | ................... | H04B 7/0639 370/329 |
| 2012/0282936 A1* | 11/2012 | Gao | ....................... | H04L 5/0023 455/450 |
| 2013/0039319 A1* | 2/2013 | Shi | ......................... | H04L 5/0023 370/329 |
| 2013/0229906 A1* | 9/2013 | Akkarakaran | ........ | H04L 5/0044 370/216 |
| 2014/0029689 A1* | 1/2014 | Liu | ....................... | H04B 7/0486 375/267 |
| 2014/0092877 A1* | 4/2014 | Kazmi | ................... | H04W 88/06 370/336 |
| 2014/0204779 A1* | 7/2014 | Zhu | ...................... | H04W 72/044 370/252 |
| 2014/0233520 A1* | 8/2014 | Lee | ....................... | H04B 7/0456 370/329 |
| 2015/0381246 A1* | 12/2015 | Huang | ................. | H04W 72/042 370/329 |
| 2016/0182137 A1* | 6/2016 | Onggosanusi | ........ | H04B 7/0469 370/329 |
| 2016/0344460 A1* | 11/2016 | Frank | ................... | H04B 7/0478 |
| 2017/0272296 A1* | 9/2017 | Manolakos | ......... | H04L 27/2613 |
| 2017/0311321 A1* | 10/2017 | Kakishima | ............ | H04W 16/28 |
| 2017/0339716 A1* | 11/2017 | Moosavi | ............... | H04L 5/0094 |
| 2018/0091207 A1* | 3/2018 | Kakishima | ........... | H04B 7/0413 |

OTHER PUBLICATIONS

Komulainen et al.; "Effective CSI Signaling and Decentralized Beam Coordination in TDD Multi-Cell MIMO Systems"; IEEE Transactions on Signal Processing, vol. 61, No. 9, May 1, 2013; pp. 2204-2218.

Komulainen et al.; "Multiuser MIMO Transceiver Strategy for TDD Uplink and Downlink in Time-Varying Channel"; Acoustics, Speech and Signal Processing, 2008; ICASSP 2008; Mar. 31, 2008; pp. 3141-3144.

Nam et al.; "Evolution of Reference Signals for LTE-Advanced Systems"; LTE Advanced and 4G Wireless Communications; IEEE Communications Magazine; Feb. 2012; pp. 132-138.

Shi et al.; "Bi-Directional Training for Adaptive Beamforming and Power Control in Interference Networks"; IEEE Transactions on Signal Processing, vol. 62, No. 3, Feb. 1, 2014; pp. 607-618.

International Search Report and Written Opinion for International Application No. PCT/EP2016/052997, dated Oct. 17, 2016, 12 pages.

* cited by examiner

APPARATUS AND METHOD FOR CONTROL SIGNALLING IN UPLINK PRECODING

CROSS-REFERENCE TO RELATED APPLICATIONS

This application is a national stage entry of PCT Application No. PCT/EP2016/052997 filed Feb. 12, 2016, entitled "APPARATUS AND METHOD FOR CONTROL SIGNALLING IN UPLINK PRECODING" which is hereby incorporated by reference in its entirety.

TECHNICAL FIELD

The exemplary and non-limiting embodiments of the invention relate generally to communications.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In wireless communication environment it is typical that the propagating conditions of radio signals vary constantly. A receiver experiences a constant variation, i.e. fading, in the signal level of transmitted signals. The radio channel is changing constantly due to fading and multipath effects, handset movement, for example.

In recent years, the use of multiple antennas in the transmitter and/or receiver which results in so called multiple-input-single-output (MISO) single-input-multiple-output (SIMO) or multiple-input-multiple-output (MIMO) radio channel has been widely studied. The use of multiple antennas may offer improved capacity and significant potential for improved reliability compared to single antenna systems. In addition, MIMO transmissions may be used to provide multi-user MIMO (MU-MIMO) communications where an access node generates multiple spatially separate communication beams and each beam is used to communicate with a subset of terminal devices of the wireless network of the access node.

BRIEF DESCRIPTION

According to an aspect, there is provided an apparatus comprising: at least one processor; and at least one memory including computer program code, the at least one memory and the computer program code configured to, with the at least one processor, cause the apparatus at least to: communicate with one or more user terminals utilising Time Division Duplexing; estimate uplink precoder parameters for the one or more user terminals; transmit the uplink precoder parameters utilising a downlink pilot signal and downlink control signalling.

According to an aspect, there is provided an apparatus comprising: at least one processor; and at least one memory including computer program code, the at least one memory and the computer program code configured to, with the at least one processor, cause the apparatus at least to: communicate with a base station apparatus utilising Time Division Duplexing; receive uplink precoder parameters utilising a downlink pilot signal and downlink control signalling.

According to an aspect, there is provided a method comprising: to communicating with one or more user terminals utilising Time Division Duplexing; estimating uplink precoder parameters for the one or more user terminals, the parameters comprising an uplink precoder matrix and a scaling factor; transmitting the uplink precoder parameters utilising a downlink pilot signal and downlink control signalling.

According to an aspect, there is provided a method comprising: communicating with a base station apparatus utilising Time Division Duplexing; receiving uplink precoder parameters utilising a downlink pilot signal and downlink control signalling.

According to an aspect, there is provided a computer program product embodied on a distribution medium readable by a computer and comprising program instructions which, when loaded into an apparatus, execute a computer process comprising: communicating with one or more user terminals utilising Time Division Duplexing; estimating uplink precoder parameters for the one or more user terminals, the parameters comprising an uplink precoder matrix and a scaling factor; and transmitting the uplink precoder parameters utilising a downlink pilot signal and downlink control signalling.

According to an aspect, there is provided a computer program product embodied on a distribution medium readable by a computer and comprising program instructions which, when loaded into an apparatus, execute a computer process comprising: communicating with a base station apparatus utilising Time Division Duplexing; and receiving uplink precoder parameters utilising a downlink pilot signal and downlink control signalling.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which.

DETAILED DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) or Wi-Fi based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

In the following, exemplifying embodiments will be described using, as an example of an access architecture to which the embodiments may be applied, a radio access architecture based on long term evolution advanced (LTE Advanced, LTE-A). It is obvious for a person skilled in the art that the embodiments may also be applied to other kinds of communications networks having suitable means by adjusting parameters and procedures appropriately.

Figure 1:
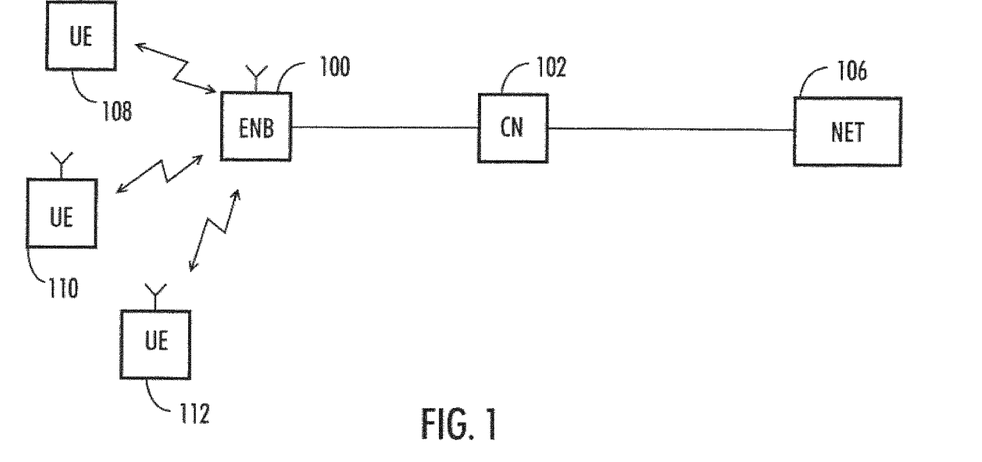
FIG. 1 illustrates a simplified view of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on long term evolution advanced (LTE Advanced, LTE-A) network elements is shown. However, the embodiments described in these examples are not limited to the LTE-A radio systems but can also be implemented in other radio systems.

FIG. 1 shows an eNodeB 100 connected to core network CN 102 of a communication system.

The eNodeBs 100 that may also be called a base station of the radio system may host the functions for Radio Resource Management: Radio Bearer Control, Radio Admission Control, Connection Mobility Control, Dynamic Resource Allocation (scheduling). Depending on the system, the counterpart on the CN side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals connect to the network.

The communication system is also able to communicate with other networks, such as a public switched telephone network or the Internet 106. The communication network may also be able to support the usage of cloud services. It should be appreciated that eNodeBs or their functionalities may be implemented by using any node, host, server or access point etc. entity suitable for such a usage.

Further, although the apparatuses have been depicted as single entities, different units, processors and/or memory units (not all shown in FIG. 1) may be implemented.

In the example of FIG. 1, the eNodeB or base station 100 is communicating with three user terminals 108, 110, 112.

The user terminal UT (also called user device, user equipment, terminal device, etc.) illustrate one type of an apparatus to which resources on the air interface are allocated and assigned, and thus any feature described herein with a user device may be implemented with a corresponding apparatus.

The user terminal typically refers to a portable computing device that includes wireless mobile communication devices operating with or without a subscriber identification module (SIM). In general, user equipment may include the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

In addition, recent developments in computing and M2M communication have led to different types of user equipment which are small low-powered devices capable of performing different tasks and communicating with communication systems. Examples of these devices include sensors and other types of devices used, for example, in automation, measurement, tracking and control applications. Typically, the communication of these devices is M2M communication, i.e. they communicate with data connections with a server or computer, for example.

In an embodiment, the eNodeB and the user terminals utilise Time Division Duplexing, TDD, when communicating with each other. In TDD both downlink (from a base station to user terminals) and uplink (from user terminals to the base station) are transmitted on the same frequency but separated in time.

In the transmissions between the eNodeB and user terminals, so called precoding may be used to modify signal to be transmitted signal prior the transmission. Precoding may be may be done for diversity, beam steering or spatial multiplexing, for example. Precoding parameters used in the transmission must be known at the receiver. Precoding may be performed using parameters selected from a given set of parameters (denoted as a codebook) or the parameters may be freely selected (denoted as non-codebook precoding).

The non-codebook based precoder designs have the benefit of much greater flexibility in terms of interference coordination and beam scheduling compared to codebook precoding. They are capable of managing wider range of interference management scenarios and systems with highly varying complexity with the same radio resource budget. However, as the used precoding must be known by both the transmitter and the receiver, some signalling between the transmitter and the receiver is required to convey information of the precoding parameters used. When codebook to precoding is used, all is required is to signal the given set of the codebook. However, non-codebook precoding presents a greater challenge to signalling. As the precoding parameters are not a set of a given codebook but may be freely selectable, the amount of information to be signalled is considerably larger. This may lead to excessive signalling overhead. For this reason, in current Long Term Evolution Advanced (LTE-A) standards the uplink MU-MIMO transmission relies only on codebook based designs. While the recent LTE-A releases have included the non-codebook based transmission modes in the downlink, the uplink transmission using non-codebook based designs still remains an open problem.

Figure 2:
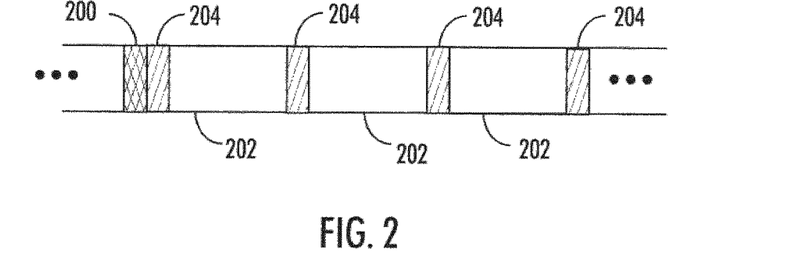
FIG. 2 illustrates an example of a LTA-TDD frame structure.

FIG. 2 illustrates an example of a LTA-TDD frame structure. The frame comprises channel sounding pilots 200 and data 202. The data may be uplink or downlink data. In LTE-TDD downlink, the TDD frame structure supports precoded pilot signalling in the form of demodulation pilots 204. The precoded pilots can be exploited to provide so called effective channels, both, in the uplink and downlink.

Precoder signalling in present cellular systems can be roughly split into two categories: pilot based signaling and control channel signaling via feedback channel. In TDD systems, the channel reciprocity allows uplink/downlink pilot signalling to convey information regarding the reciprocal channel. That is, the channel sounding pilots can be used to estimate, both, the uplink and downlink channels simultaneously. The channel reciprocity has been widely exploited in downlink precoder design, where the effective channel state information (channels with the receivers applied) can be directly estimated from the precoded uplink pilots. This enables efficient estimation of the receiver signal space and iterative precoder design with very low control channel and backhaul signalling overhead.

One of the major obstacles in the uplink MU-MIMO precoder design is the lack of global channel state information (CSI) at the user terminals. The direct channel estimation only covers the local channel between each user terminal and the base station. Without any additional information exchange, the user terminals do not know the interfering channels, i.e, the channels between the interfering users and the base station. This makes it impossible to efficiently design the precoders at each user terminal.

In TDD systems, the channel reciprocity enables the estimation of the uplink channels from the uplink channel sounding pilots. This effectively enables the base station to estimate the uplink channels between each user terminal, and, thus, essentially obtaining the global CSI at the base station.

Figure 3:
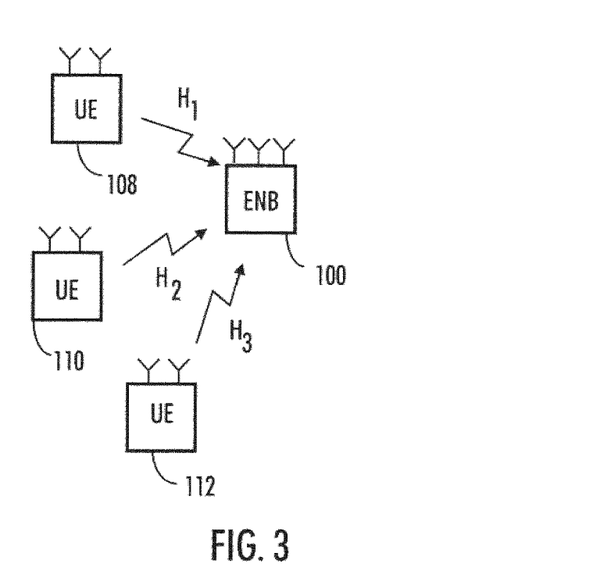
FIG. 3 illustrates an example of the CSI estimation.

FIG. 3 illustrates an example of the CSI estimation at the base station 100 for a three user (108, 110, 112) multiple-input multiple-output (MIMO) system. The global uplink CSI allows the base station 100 to design the uplink precoders. This is procedure has already been enabled in the current LTE standards.

Thus, solving the uplink precoder matrixes at the base station is a well-established process. However, signalling non-codebook precoder matrices back to the user terminals is more problematic. A non-codebook based uplink MU-MIMO precoding may cause excessive downlink control signalling requirements, when informing each user of the transmit precoder matrices. Even for a modest number of transmit/receive antennas, the amount control signalling easily exhausts the current control signalling standards.

Let us take a 2×4 MIMO system as an example. In this case, we have two transmit antennas at each user terminal and 4 receive antennas at the base station. The maximum number of spatial data streams between each user and the base station is limited to L=2. This gives us precoder matrix of user k as $B_k \in C^{2 \times 2}$. To feedback the whole precoder matrix requires 2×2=4 complex scalars which correspond to 8 real scalar values in total. If 8 bit quantization per scalar is assumed the result is 64 bits per precoder matrix. This effectively doubles the downlink control information (DCI) frame length requirements in downlink Layer1/Layer2 signalling as defined in the current LTE standards.

Figure 4:
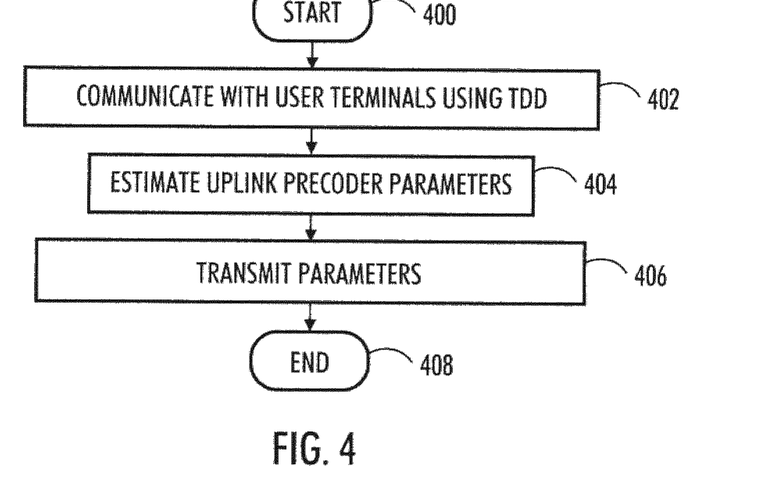
FIGS. 4 and 5 are flowcharts illustrating embodiments of the invention.

FIG. 4 is a flowchart illustrating an embodiment of the invention. The flowchart illustrates an example of the operation of a base station or an eNodeB. The apparatus may be a base station or an eNodeB or a part of a base station or an eNodeB. The order of the steps below may be changed.

The example begins at step 400.

In step 402, the apparatus is configured to communicate with one or more user terminals utilising Time Division Duplexing. Thus, both uplink and downlink communication utilises the same frequency or frequency band.

In step 404, the apparatus is configured to estimate uplink precoder parameters for the one or more user terminals. The apparatus is configured to utilise the channel reciprocity and to estimate the uplink channels between each user terminal, and, thus, essentially obtain the global CSI.

In step 406, the apparatus is configured to transmit the uplink precoder parameters utilising a downlink pilot signal and downlink control signalling.

The example ends at step 408.

Figure 5:
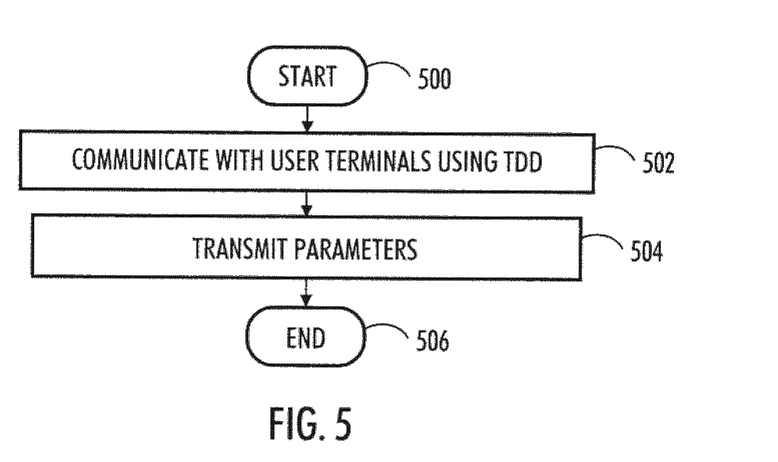

FIG. 5 is a flowchart illustrating an example embodiment of the operation of an apparatus. The apparatus may be a user terminal or a part of a user terminal. The order of the steps below may be changed and steps may be combined.

The example begins at step 500.

In step 502, the apparatus is configured to communicate with a base station apparatus utilising Time Division Duplexing. Thus, both uplink and downlink communication utilises the same frequency or frequency band.

In step 504 the apparatus is configured to receive uplink precoder parameters utilising a downlink pilot signal and downlink control signalling.

The example ends at step 506.

Referring to FIG. 2, in the current LTE standards, base stations can have user specific downlink demodulation pilots 204 (demodulation reference signals) that may be precoded with the same precoder as used for the data. These are used, in one part, to inform the user terminals of the non-codebook based precoders. However, so far this has only applied to the downlink transmission.

Embodiments of the invention propose an additional pilot resource in the downlink to convey the uplink precoder information to the user terminals. Estimating the precoder matrices from a downlink pilot signal reduces the signalling overhead to only a few OFDM symbols per iteration. This significantly reduces the signalling overhead, when compared to feedback of the quantized precoder matrices over separate feedback channel.

Figure 6:
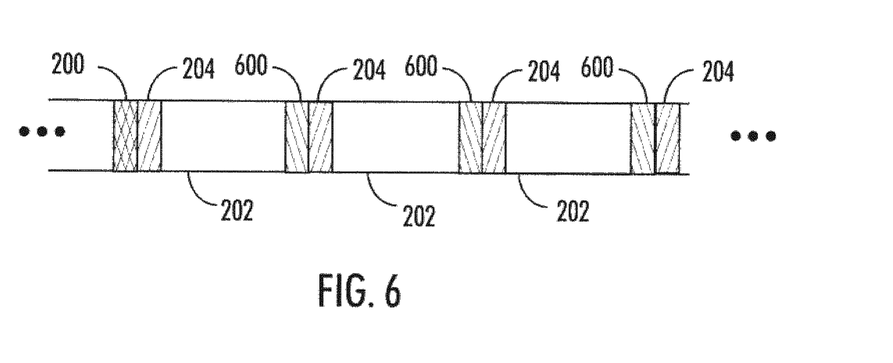
FIG. 6 illustrates an example of the LTE-TDD frame structure according to an embodiment.

FIG. 6 illustrates an example of the LTE-TDD frame structure. The frame structure comprises channel sounding pilots 200, data 202 and demodulation pilots 204. In addition, precoder pilots 600 are transmitted by the base station. This way it is possible to transmit the required information with very low cost to the user terminals.

The uplink precoder matrices denote the antenna and spatial data stream specific power loading information. For a K-user MIMO uplink system, we denote the precoder matrix for user k as $B_k \in C^{N_T \times L}$, where $N_T$ is the number of transmit antennas and L is the number of spatial data streams. To convey the precoder information in K-user MIMO uplink by exploiting the precoded downlink pilots of the TDD systems, we can express the precoded downlink pilot for user k=1, ..., K as $$M_k = H_k X_k, \quad (1)$$

where $H_k \in C^{N_T \times N_B}$ is the channel matrix between the base station and user, $X_k \in C^{N_B \times L}$ is the pilot precoder and $M_k \in C^{N_T \times L}$ is the received pilot symbol matrix. Ideally, $X_k$ should be formulated such that $M_k$ equals to $B_k$.

It may be noted, that the dimensions of $M_k$ need match the dimensions of the $B_k$. Fortunately, since L can be freely determined at the base station, the dimensions can be always made to match. This applies especially when the number of antennas at to the base station is greater than the number of antennas at the mobile station.

It is proposed to formulate downlink pilot precoders $X_k$ such that the received (estimated) downlink pilots at the receiver side will match the intended precoder matrices. The formulation may be expressed as finding any $X_k$ that minimizes the distance between $B_k$ and $H_k X_k$, that is, a solution to $$X_k = \arg\min_x \cdot \|B_k - H_k X\|^2 \,\forall\, k = 1, \ldots, K.$$

In case there are more antennas at the base station than at the user terminals, the desired solution can be very straightforwardly characterized as $$X_k = H_k^H (H_k H_k^H)^{-1} B_k \,\forall k = 1, \ldots, K. \quad (2)$$

If there are more receive antennas than transmit antennas ($N_T > N_B$), it is not possible to estimate the uplink precoders from the pilots as straightforwardly. However, it is still design $X_k$ such that the precoders can be conveyed over pilot signalling with minimal effort.

If we assume that $L \leq_T$, we may design the downlink pilot precoder $X_k \in C^{N_T \times N_B}$ (where the pilot sequence length is thus now $N_B$), such that $$H_k^H = C H_k X_k,$$

where $C \in C^{L \times N_T}2$ is any predetermined projection matrix with rank(C)=L. Similar to (2), the least squares design becomes $$X_k = H_k^H C^H (C H_k H_k^H C^H)^{-1} B_k^H \,\forall k = 1, \ldots, K. \quad (3)$$

To recover $B_k$, the user terminals may estimate the precoder matrices by multiplying the received downlink pilots $H_k X_k$ by C and take a conjugate transpose.

In practice, however, pilot estimation is not perfect and only the relative difference of the symbol magnitudes can be estimated. Thus, we can assume that the estimated pilots $\hat{M}_k$ from (1) satisfy $$p_k \hat{M}_k = M_k$$

$$\|\hat{M}_k\|_F = 1 \quad (4)$$

where $p_k$ is a scaling factor and $\|\ \|_F$ denotes Frobenius norm. According to (4), the scaling coefficients can be directly determined using the corresponding the complete pilot information, at the base station, as $$p_k = \|M_k\|_F.$$

The base station should be able to signal information on the scaling factor to the user terminals. This may be realising using existing control signalling. However, the control signalling overhead regarding the scaling factor still comprises only of one real scalar, regardless of the antenna configuration. This is considerable saving in terms of signalling overhead, when compared to the feedback of the full precoder matrices.

Figure 7:
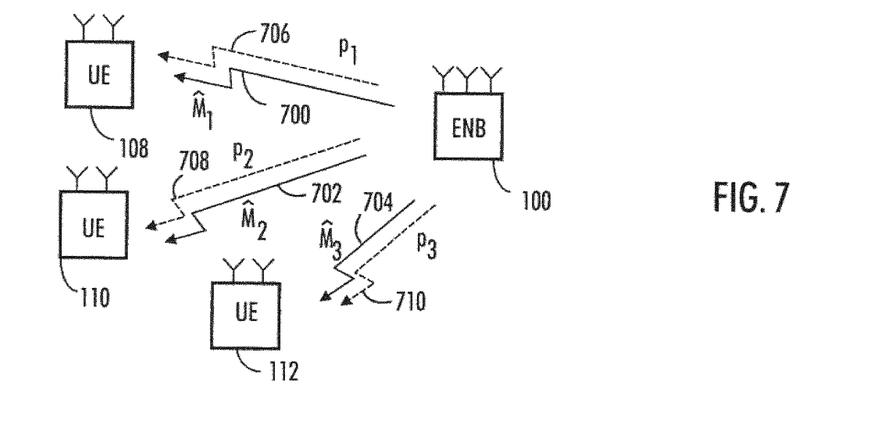
FIG. 7 illustrates an example of the transmission of the precoder to parameters.

FIG. 7 illustrates an example of the transmission of the precoder parameters from the base station 100 to the user terminals 108, 110, 112. The matrix $\hat{M}_k$ is transmitted 700, 702, 704 using downlink precoder pilot. The scaling factors $p_k$ are transmitted 706, 708, 710 using control signalling. In an embodiment, one option for conveying coefficient $p_k$ to the corresponding user, is to expand the LTE Downlink scheduling Control Information (DCI) message protocol and transmit the scaling coefficient over the Physical Downlink Control Channel (PDCCH).

Table 1 shows some examples on the amount of control feedback signalling required by full precoder feedback and the proposed precoded pilot based signalling.

TABLE 1

| Antenna configuration | 2 × 2 | 4 × 2 | 4 × 4 |
|---|---|---|---|
| Full precoder feedback | 8 real scalars | 16 real scalars | 32 real scalars |
| Precoded pilot signalling | 1 real scalar | 1 real scalar | 1 real scalar |

As the above table indicates, with the proposed solution it is possible to use non-codebook based uplink precoding with similar signaling overhead to codebook based methods. The solution can be easily generalized to varying system models and scenarios.

Figure 8:
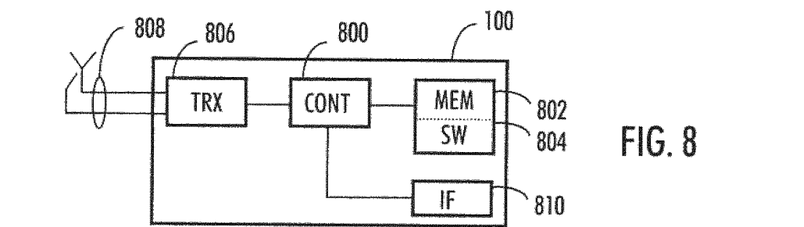
FIGS. 8, 9 and 10 illustrate simplified examples of apparatuses in which some embodiments of the invention may be applied.

FIG. 8 illustrates an embodiment. The figure illustrates a simplified example of an apparatus in which embodiments of the invention may be applied. In some embodiments, the device may be a base station 100 or eNodeB or a part of an eNodeB communicating with a set of UEs.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 800 configured to control at least part of the operation of the apparatus.

The apparatus may comprise a memory 802 for storing data. Furthermore the memory may store software 804 executable by the control circuitry 800. The memory may be integrated in the control circuitry.

The apparatus comprises a transceiver 806. The transceiver is operationally connected to the control circuitry 800. It may be connected to an antenna arrangement 808 comprising a set of antenna elements or antennas.

The software 804 may comprise a computer program comprising program code means adapted to cause the control circuitry 800 of the apparatus to control a transceiver 806.

The apparatus may further comprise an interface 810 operationally connected to the control circuitry 800. The interface may connect the apparatus to other respective apparatuses such as eNodeB via X2 interface or to the core network.

The control circuitry 800 is configured to execute one or more applications. The applications may be stored in the memory 802. The applications may cause the apparatus to communicate with one or more user terminals utilising Time Division Duplexing, estimate uplink precoder parameters for the one or more user terminals and transmit the uplink precoder parameters utilising a downlink pilot signal and downlink control signalling, for example.

Figure 9:
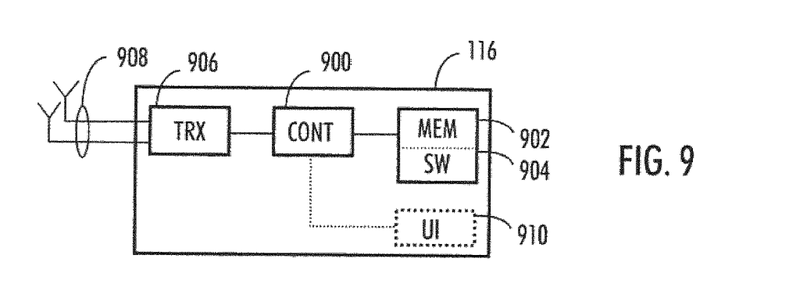

FIG. 9 illustrates an embodiment. The figure illustrates a simplified example of an apparatus in which embodiments of the invention may be applied. In some embodiments, the apparatus may be user terminal or a part of user terminal configured to communicate with an eNodeB or a base station.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 900 configured to control at least part of the operation of the apparatus.

The apparatus may comprise a memory 902 for storing data. Furthermore the memory may store software 904 executable by the control circuitry 900. The memory may be integrated in the control circuitry.

The apparatus comprises a transceiver 906. The transceiver is operationally connected to the control circuitry 900. It may be connected to an antenna arrangement 908 comprising a set of antenna elements or antennas.

The software 904 may comprise a computer program comprising program code means adapted to cause the control circuitry 900 of the apparatus to control a transceiver 906.

in some embodiments, the apparatus may further comprise user interface 910 operationally connected to the control circuitry 900.

The control circuitry 900 is configured to execute one or more applications. The applications may be stored in the memory 902. The applications may cause the apparatus to communicate with a base station apparatus utilising Time Division Duplexing and receive uplink precoder parameters utilising a downlink pilot signal and downlink control signalling, for example.

Figure 10:
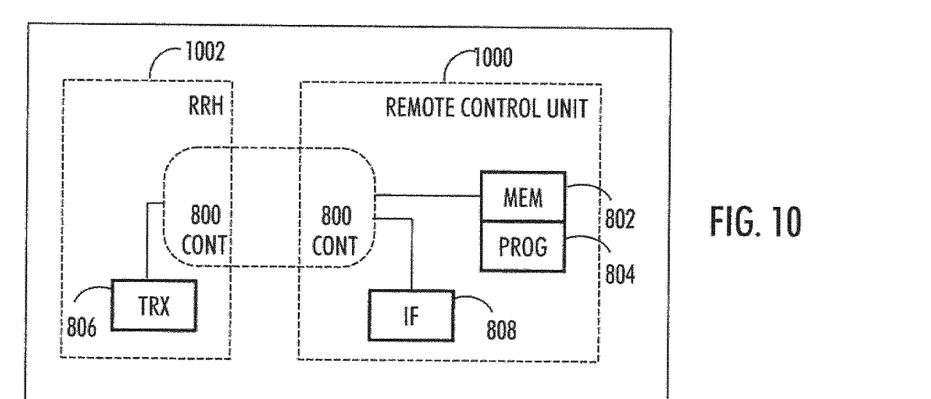

In an embodiment, as shown in FIG. 10, at least some of the functionalities of the apparatus of FIG. 8 may be shared between two physically separate devices, forming one operational entity. Therefore, the apparatus may be seen to depict the operational entity comprising one or more physically separate devices for executing at least some of the described processes. Thus, the apparatus of FIG. 8, utilizing such shared architecture, may comprise a remote control unit RCU 1000, such as a host computer or a server computer, operatively coupled (e.g. via a wireless or wired network) to a remote radio head RRH 1002 located in the base station. In an embodiment, at least some of the described processes may be performed by the RCU 1000. In an embodiment, the execution of at least some of the described processes may be shared among the RRH 1002 and the RCU 1000.

In an embodiment, the RCU 1000 may generate a virtual network through which the RCU 1000 communicates with the RRH 1002. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

The embodiments are not, however, restricted to the system given as an example but a person skilled in the art may apply the solution to other communication systems provided with necessary properties. Another example of a suitable communications system is the 5G concept. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access to technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of to processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
at least one processor; and
at least one memory including computer program code, the at least one memory and the computer program code configured to, with the at least one processor, cause the apparatus at least to:
communicate with one or more user terminals using time division duplexing;
estimate uplink precoder parameters for the one or more user terminals; and
transmit the estimated uplink precoder parameters to the one or more terminals using a precoder pilot and downlink control signalling.

2. The apparatus of claim 1, wherein the apparatus is further configured to:
estimate the uplink precoder parameters where the parameters comprise an uplink precoder matrix and a scaling factor.

3. The apparatus of claim 1, wherein the apparatus is further configured to:
transmit information on an uplink precoder matrix using the precoder pilot and the scaling factor using downlink control signalling.

4. The apparatus of claim 1, wherein the apparatus is further configured to:
estimate the uplink precoder parameters for the one or more user terminals from signals received from the one or more user terminals.

5. A method comprising:
communicating with one or more user terminals using time division duplexing;
estimating uplink precoder parameters for the one or more user terminals, the parameters comprising an uplink precoder matrix and a scaling factor; and
transmitting the estimated uplink precoder parameters to the one or more terminals using a precoder pilot and downlink control signalling.

6. The method of claim 5, further comprising:
estimating the uplink precoder parameters where the parameters comprise an uplink precoder matrix and a scaling factor.

7. The method of claim 5, further comprising:
transmitting information on an uplink precoder matrix using the precoder pilot and the scaling factor using downlink control signalling.

8. The method of claim 5, further comprising:
estimating the uplink precoder parameters for the one or more user terminals from signals received from the one or more user terminals.

9. A method comprising:
communicating with a base station apparatus using time division duplexing; and
receiving uplink precoder parameters using a precoder pilot and downlink control signalling.

10. The method of claim 9, wherein the uplink precoder parameters comprise an uplink precoder matrix and a scaling factor, the method further comprising:
receiving information on the uplink precoder parameters using the precoder pilot and the scaling factor using downlink control signalling.

11. A computer program product, the computer program product being tangibly embodied on a non-transitory computer-readable storage medium and including instructions that, when executed by at least one processor, are configured to perform the method of claim 5.

12. A computer program product, the computer program product being tangibly embodied on a non-transitory computer-readable storage medium and including instructions that, when executed by at least one processor, are configured to perform the method of claim 9.

13. The apparatus of claim 1 wherein the apparatus being configured to transmit the uplink precoder parameters comprises the apparatus being configured to:
transmit an uplink precoder matrix using resources of the precoder pilot; and
transmit a scaling factor via downlink control information of a physical downlink control channel.

14. The method of claim 9 wherein the receiving uplink precoder parameters comprises:
receiving an uplink precoder matrix via resources of the precoder pilot; and receiving a scaling factor via downlink control information of a physical downlink control channel.

* * * * *